United States Patent [19]

Grubb

[11] 4,012,170

[45] Mar. 15, 1977

[54] FABRICATED CROWN PLATE FOR FRANCIS-TYPE HYDRAULIC TURBINE RUNNER

[75] Inventor: Robert G. Grubb, York, Pa.

[73] Assignee: Allis-Chalmers Corporation, Milwaukee, Wis.

[22] Filed: Aug. 18, 1975

[21] Appl. No.: 605,755

[52] U.S. Cl. .................... 416/186 R; 416/213 R; 415/172 R; 416/174

[51] Int. Cl.² .......................................... F01D 5/14

[58] Field of Search .......... 416/186, 174, 183, 213, 416/244 A; 29/156 CF; 415/172, DIG. 5, 170 A

[56] References Cited

UNITED STATES PATENTS

| 2,691,812 | 10/1954 | Misch | 29/156.8 |
|---|---|---|---|
| 2,784,936 | 3/1957 | Schmidt | 416/186 |
| 2,807,871 | 10/1957 | Wagner et al. | 29/156.8 |
| 3,797,965 | 3/1954 | Tonooka et al. | 416/186 |
| 3,874,819 | 4/1975 | Tamura et al. | 416/186 |

FOREIGN PATENTS OR APPLICATIONS

| 1,177,950 | 4/1959 | France | 416/186 |
|---|---|---|---|
| 755,198 | 11/1952 | Germany | 416/183 |
| 1,100,223 | 2/1961 | Germany | 416/213 |
| 1,173,038 | 6/1964 | Germany | 416/183 |
| 417,543 | 1/1947 | Italy | 416/244 A |
| 632,475 | 11/1949 | United Kingdom | 416/186 |

Primary Examiner—Everette A. Powell, Jr.
Attorney, Agent, or Firm—John P. Hines

[57] ABSTRACT

A fabricated crown for a Francis-type hydraulic turbine runner. The crown is fabricated from an integrally formed inner circular portion and a pair of outer semi-circular portions welded thereto. The inner circular portion provides a rigid section of high integrity to which the runner shaft is connected.

1 Claim, 3 Drawing Figures

FABRICATED CROWN PLATE FOR FRANCIS-TYPE HYDRAULIC TURBINE RUNNER

This invention pertains in general to hydraulic machine runners and more particularly to the fabricated upper plate for such a runner.

The invention will be described in connection with a Francis-type turbine runner, however, it does have application to all hydraulic machines having runners or impellers similar to the Francis runner.

The Francis-type of hydraulic turbine runner comprises a crown to which the shaft is attached, a shroud ring or band, and a plurality of blades or buckets connected between the crown and the band. The buckets are provided with the desired curvature to exert a rotational force on the shaft as water flows through the runner.

In the past, Francis runners of this type have been constructed of a single casting. However, as the turbines became larger, the runners were fabricated of partial castings and plate steel welded or bolted together. In some instances, the turbines become so large that it is impractical or even impossible to fabricate the turbine parts completely in a manufacturing plant and ship it by the usual carrier to the site at which it is to be used. This is due to the fact that bridge clearances, tunnel sizes, track spacings and other factors all operate to limit the size of articles which can be shipped over any given route. As an example, turbine runners are now being manufactured having an outside diameter of 32.5 feet and weighing approximately 450 tons.

Some examples of prior art fabricated runners are shown in patents U.S. Pat. No. 1,917,037 issued to George A. Jessop et al, July 4, 1933, U.S. Pat. No. 2,611,578 issued to George A. Biggs, Sept. 23, 1952 and British patent 632,475 having an application date of Dec. 7, 1947. These patents are cited as representative of the prior art and are not to be considered as a complete showing of the art.

In the usual case of sectionalizing the crown of a Francis turbine, the sections were connected along radial joints extending the full diameter of the crown. However, such an arrangement required a weld along a point which had a varying cross-sectional thickness. Although such a weld can be accomplished, it is more time consuming and requires more precise manipulation of the welding mechanism. To overcome a varying thickness weld, it is possible to construct the crown of a single thickness. When constructing a crown of a single thickness, the whole crown must be as thick as the thickest part of a varying thickness crown. This wastes metal resulting in a more expensive and heavier part.

It is, therefore, the intention and general object of this invention to provide a fabricated crown for a Francis turbine runner which overcomes the shortcomings of the prior art fabricated crowns.

An additional object of the subject invention is to provide a fabricated crown for a Francis-type runner wherein the inner crown portion is an integrally formed circular portion to which the outer sectionalized portions are connected having a circular joint with a uniform cross-sectional thickness.

A further object of the subject invention is to provide a crown of the hereinbefore described type wherein a runner crown seal ring is connected to the crown at the circular joint to further strengthen this joint.

A more specific object of the subject invention is to provide a crown of the hereinbefore described type wherein each runner bucket spans the connection between the inner and outer crown portions to further strengthen the connecting joint.

These and other objects of the subject invention will become more fully apparent as the following description is read in light of the attached drawing wherein.

Figure 3:
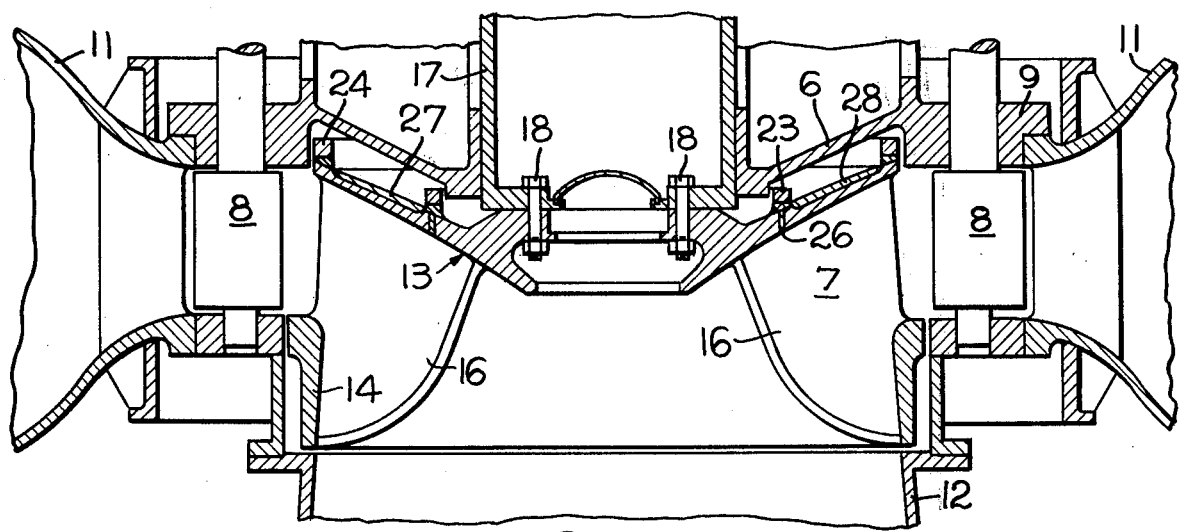
FIG. 3 is a vertical sectional view of a portion of a hydraulic turbine showing a crown constructed in accordance with the invention.

Referring to FIG. 3, there is disclosed a portion of a hydraulic turbine. In this instance, a Francis turbine. Broadly, the turbine comprises; a head cover 6 that is stationary and spans the top of the turbine runner 7 and wicket gates 8; a stay ring 9 which is a structural member joining the spiral case 11 with the top and bottom parts of the turbine; and a draft tube 12 through which the water exits from the turbine.

The runner 7 is composed of a top plate or crown 13 and a bottom plate or band 14. A plurality of circumferentially spaced vanes or buckets 16 are rigidly connected between the crown and band to form the runner 7.

A turbine shaft 17 is rigidly connected to the runner crown in any conventional manner such as by bolts 18. The shaft is in turn in the conventional manner connected to a generator (not shown) for the production of electricity.

Figure 1:
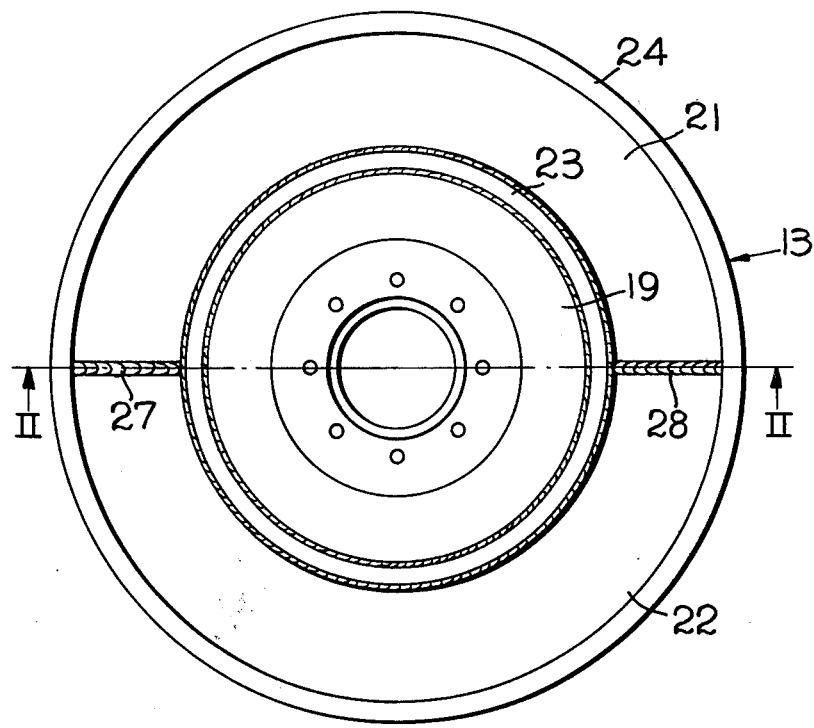
FIG. 1 is a plan view of a crown constructed in accordance with the invention.
Figure 2:
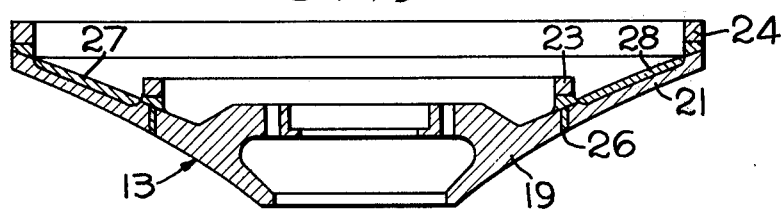
FIG. 2 is a cross-sectional view taken along the line II—II of FIG. 1.

Referring more specifically to FIGS. 1 and 2, the crown of the subject invention is composed of a inner hub section 19 and at least a pair of outer arcuate sections 21 and 22. Each of these inner and outer sections are integrally formed either by casting or are formed from plate steel. The runner is also provided with a pair of inner and outer seal rings 23 and 24 which are connected to the surface of the crown remote from the buckets 7.

The sequence of fabrication of the crown is as follows: (1) the outer crown segments 21 and 22 are placed on a weld positioner and braced in the assembled position with the top facing upward; (2) the inner crown seal 23 is then welded to the outer segments 21 and 22 with half of its thickness extending over the inner edge; (3) the outer segments with the inner seal ring are then inverted and braced on the positioner with the top down; (4) the inner crown section 19 is placed on the weld positioner with its shaft bolting face down inside of the outer crown segments resting against the bottom of the inner crown seal ring 23; (5) the crown is then rotated about its axis and the circular welds are completed between the inner crown section 19 and the inner seal ring 23; (6) the radial welds 27 and 28 between the outer crown segments 21 and 22 are completed; (7) the crown is again inverted and the 360 degree circumferential weld 26 is made between the inner crown section 19 and the two outer crown segments 21 and 22. If not integral with outer crown segments, 21 and 22. If not integral with outer crown segments 21 and 22, the outer seal ring 24 is then welded to the outer crown segments 21 and 22 and a rigid one piece crown results.

When the buckets 7 are welded to the crown 13, each bucket spans the circumferential weld 26. This adds further strength to the crown.

With this arrangement, the inner crown section 19 is a one-piece unit which can be either cast or fabricated at the factory and can be inspected to insure its integrity. It can be accurately machined in the manufacturing plant to insure proper mating relationship with the turbine shaft 17. Once in the field, the inner and outer sections of the crown can be connected together in the manner described above. It can be seen that this arrangement provides for an exceptionally rigid crown and one of known integrity. Furthermore, by providing the connecting circular weld 26 at the location of the inner seal ring 23, a backup bar is not required during the welding procedure.

The embodiments of the invention in which an exclusive property or privilege is claimed are defined as follows:

1. A turbine and pump runner having a crown and a band with a plurality of circumferentially spaced runner buckets connected therebetween, said crown comprising: an integrally formed inner circular section extending in a plane substantially transverse to the axis of rotation of the runner and forming a bucket mounting surface; at least two integrally formed arcuate outer sections rigidly connected to said inner section by a circular weldment and to one another and forming with said inner section a continuation of said bucket mounting surface; a plurality of runner buckets connected to said bucket mounting surface; and a runner seal ring connected to the surface of said crown opposite to said bucket mounting surface and being concentric with and overlying said circular weldment.

* * * * *